(12) United States Patent
Sridharan et al.

(10) Patent No.: US 9,372,638 B1
(45) Date of Patent: Jun. 21, 2016

(54) SYSTEMS AND METHODS FOR BACKING UP VIRTUAL MACHINE DATA

(71) Applicant: Symantec Corporation, Mountain View, CA (US)

(72) Inventors: Srineet Sridharan, Maharashtra (IN); Kirk Searls, Maitland, FL (US); Arindam Panna, Maharashtra (IN)

(73) Assignee: Veritas Technologies LLC, Mountain View, CA (US)

( * ) Notice: Subject to any disclaimer, the term of this patent is extended or adjusted under 35 U.S.C. 154(b) by 185 days.

(21) Appl. No.: 13/763,163

(22) Filed: Feb. 8, 2013

(51) Int. Cl.
*G06F 12/00* (2006.01)
*G06F 3/06* (2006.01)

(52) U.S. Cl.
CPC ...................................... *G06F 3/065* (2013.01)

(58) Field of Classification Search
CPC ............ G06F 11/1456; G06F 11/2074; G06F 11/2071; G06F 11/1451; G06F 11/2082
USPC ......................................................... 711/162
See application file for complete search history.

(56) References Cited

U.S. PATENT DOCUMENTS

| | | | |
|---|---|---|---|
| 7,774,391 B1 | 8/2010 | Le et al. | |
| 8,850,146 B1 | 9/2014 | Majumdar | |
| 2005/0165867 A1* | 7/2005 | Barton et al. | 707/204 |
| 2007/0277010 A1* | 11/2007 | Anand et al. | 711/162 |
| 2008/0270670 A1* | 10/2008 | Usami | 710/316 |
| 2009/0327628 A1* | 12/2009 | Narayanan | G06F 11/1474 711/162 |
| 2010/0030983 A1* | 2/2010 | Gupta et al. | 711/162 |
| 2010/0070725 A1 | 3/2010 | Prahlad et al. | |
| 2011/0010515 A1* | 1/2011 | Ranade | 711/162 |
| 2011/0202735 A1* | 8/2011 | Kono et al. | 711/162 |
| 2012/0290802 A1* | 11/2012 | Wade et al. | 711/162 |

OTHER PUBLICATIONS

Mohit Jha; Systems and Methods for Applying Storage Lifecycle Policies to Backups; U.S. Appl. No. 13/493,474, filed Jun. 11, 2012.
Tomasz Wilk, et al; Systems and Methods for Backing Up Heterogeneous Virtual Environments; U.S. Appl. No. 14/261,808, filed Apr. 25, 2014.
Shweta Goyal et al.; Systems and Methods for Sending Information to Guest Systems Within Virtual Machines; U.S. Appl. No. 13/748,556, filed Jan. 23, 2013.
Ynn-Pyng Tsaur et al.; Systems and Methods for Simplifying Data Restoration Using Resource Types; U.S. Appl. No. 13/650,054, filed Oct. 11, 2012.

(Continued)

*Primary Examiner* — Charles Rones
*Assistant Examiner* — Nanci Wong
(74) *Attorney, Agent, or Firm* — ALG Intellectual Property, LLC

(57) ABSTRACT

A computer-implemented method for backing up virtual machine data may include (1) identifying a volume of data for a guest system within a virtual machine that may be scheduled for a backup from outside the guest system, (2) identifying, before the backup may be scheduled to occur, a plurality of blocks within the volume of data that have changed since a previous backup of the volume of data, (3) partially performing the backup by copying the plurality of blocks to a backup image and (4) completing the backup from outside the guest system once the backup may be scheduled to occur by copying to the backup image an additional plurality of blocks within the volume of data that have changed since identifying the plurality of blocks. Various other methods, systems, and computer-readable media are also disclosed.

20 Claims, 6 Drawing Sheets

(56) References Cited

OTHER PUBLICATIONS

"Veeam®", http://www.veeam.com/, as accessed Nov. 14, 2012, (Aug. 21, 2006).

"AppAssure", http://www.appassure.com/, as accessed Nov. 14, 2012, (Jul. 30, 2003).

"CommVault", http://www.commvault.com/, as accessed Nov. 14, 2012, (Dec. 2, 1998).

"Avamar", http://www.emc.com/data-protection/avamar.htm, as accessed Nov. 14, 2012, (on or before Nov. 14, 2012).

"Tivoli", http://www-01.ibm.com/software/tivoli/, as accessed Nov. 14, 2012, (May 31, 2008).

"HP Data Protector", http://www8.hp.com/us/en/software-solutions/data-protector-backup-recovery-software/, as accessed Nov. 14, 2012, (On or before Nov. 14, 2012).

* cited by examiner

SYSTEMS AND METHODS FOR BACKING UP VIRTUAL MACHINE DATA

BACKGROUND

In the digital age, organizations increasingly rely on digitally-stored data. To protect against data loss, an organization may use a backup system to back up important data. In some cases, an organization may handle and store data via virtual machines. Accordingly, a backup system may back up data from a virtual disk to preserve data handled by a virtual machine.

Unfortunately, backup operations on a virtual machine may interfere with one or more primary applications executing within the virtual machine. For example, traditional systems may perform regularly scheduled backups, which may incur significant input/output costs and impact primary applications running within virtual machines. In some examples, traditional systems may take snapshots of virtual machine data. However, when these traditional systems commit these snapshots, these traditional systems may incur high input/output costs. Since a commit operation may take a long time to complete, these traditional systems may potentially degrade and/or disrupt primary application performance over a long period.

Accordingly, the instant disclosure identifies and addresses a need for additional and improved systems and methods for backing up virtual machine data.

SUMMARY

As will be described in greater detail below, the instant disclosure generally relates to systems and methods for backing up virtual machine data by performing background backup operations (e.g., from within guest systems) between scheduled backups by identifying blocks within guest system data volumes that have changed. These systems and methods may then perform scheduled backups more efficiently having already performed the background backup operations. In some examples, these systems and methods may use external snapshot metadata to identify these changed blocks.

In one example, a computer-implemented method for backing up virtual machine data may include (1) identifying a volume of data for a guest system within a virtual machine that may be scheduled for a backup from outside the guest system, (2) identifying, before the backup may be scheduled to occur, a plurality of blocks within the volume of data that have changed since a previous backup of the volume of data, (3) partially performing the backup by copying the plurality of blocks to a backup image and (4) completing the backup from outside the guest system once the backup may be scheduled to occur by copying to the backup image an additional plurality of blocks within the volume of data that have changed since identifying the plurality of blocks.

In some examples, identifying the plurality of blocks may include (1) creating a snapshot of a virtual disk of the virtual machine comprising the volume of data, (2) identifying block metadata within the snapshot that may indicate that the plurality of blocks have changed since creating the snapshot and (3) sending the block metadata to the guest system within the virtual machine.

In some examples, sending the block metadata to the guest system may include translating the block metadata for use by the guest system by mapping at least one block identifier of a changed block within the block metadata to a virtual block identifier that identifies the changed block with an addressing scheme readable by the guest system.

In some examples, sending the block metadata to the guest system within the virtual machine may include sending the block metadata from a host system that hosts the virtual machine without sending a content of the plurality of blocks to the guest system.

In some examples, the computer-implemented method may include releasing the snapshot before partially performing the backup.

In one embodiment, partially performing the backup may include (1) determining that a load of at least one computing resource used by the guest system may be below a predetermined level and (2) partially performing the backup in response to the load of the computing resource being below the predetermined level.

In one embodiment, partially performing the backup may include (1) determining that a load of at least one computing resource used by the guest system has risen above a predetermined level and (2) throttling the backup in response to the load of the computing resource rising above the predetermined level.

In some examples, partially performing the backup may include partially performing the backup via an agent executing within the guest system.

In one embodiment, a system for implementing the above-described method may include (1) an identification module programmed to identify a volume of data for a guest system within a virtual machine that may be scheduled for a backup from outside the guest system, (2) a change module programmed to identify, before the backup may be scheduled to occur, a plurality of blocks within the volume of data that have changed since a previous backup of the volume of data, (3) a performing module programmed to partially perform the backup by copying the plurality of blocks to a backup image, (4) a completion module programmed to complete the backup from outside the guest system once the backup may be scheduled to occur by copying to the backup image an additional plurality of blocks within the volume of data that have changed since identifying the plurality of blocks and (5) at least one processor configured to execute the identification module, the change module, the performing module and the completion module.

In some examples, the above-described method may be encoded as computer-readable instructions on a computer-readable-storage medium. For example, a computer-readable-storage medium may include one or more computer-executable instructions that, when executed by at least one processor of a computing device, may cause the computing device to (1) identify a volume of data for a guest system within a virtual machine that may be scheduled for a backup from outside the guest system, (2) identify, before the backup may be scheduled to occur, a plurality of blocks within the volume of data that have changed since a previous backup of the volume of data, (3) partially perform the backup by copying the plurality of blocks to a backup image and (4) complete the backup from outside the guest system once the backup may be scheduled to occur by copying to the backup image an additional plurality of blocks within the volume of data that have changed since identifying the plurality of blocks.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification.

Together with the following description, these drawings demonstrate and explain various principles of the instant disclosure.

Figure 1:
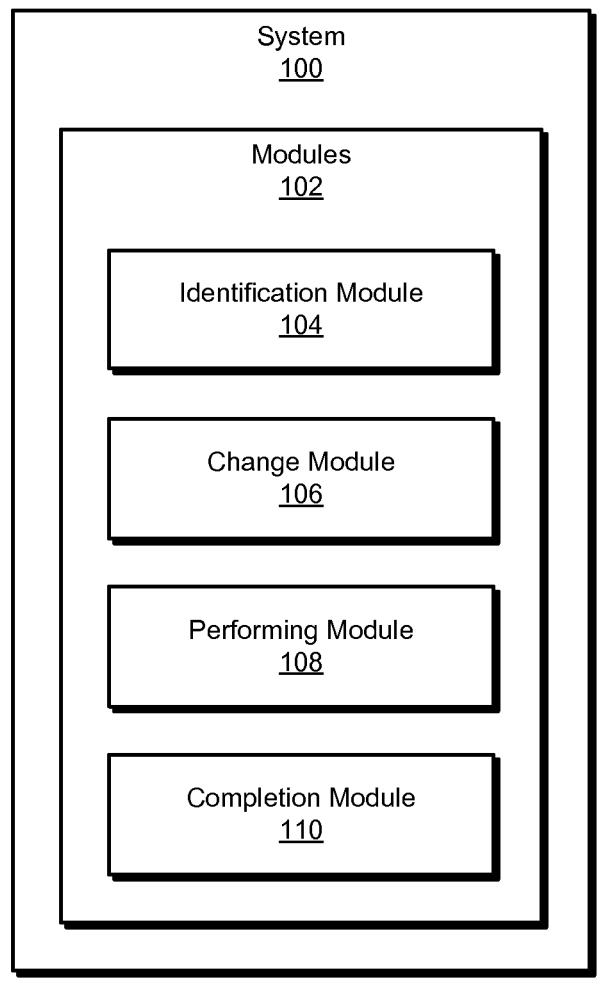
FIG. 1 is a block diagram of an exemplary system for backing up virtual machine data.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to systems and methods for backing up virtual machine data. As will be explained in greater detail below, by performing background backup operations (e.g., from within guest systems) between scheduled backups by identifying blocks within guest system data volumes that have changed, these systems and methods may then perform scheduled backups more efficiently having already performed the background backup operations. In some examples, these systems and methods may use external snapshot metadata to identify these changed blocks.

Figure 2:
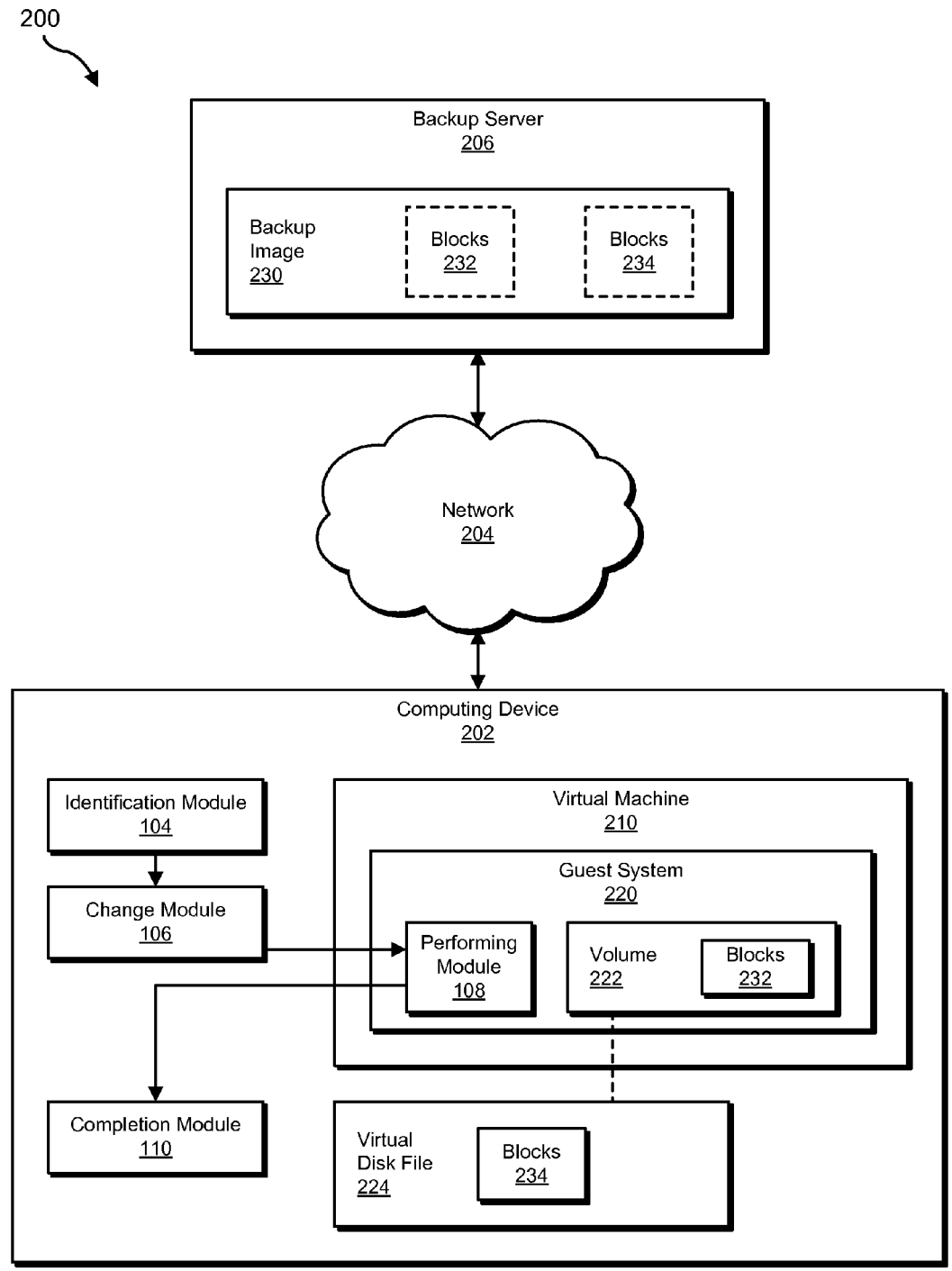
FIG. 2 is a block diagram of an exemplary system for backing up virtual machine data.
Figure 3:
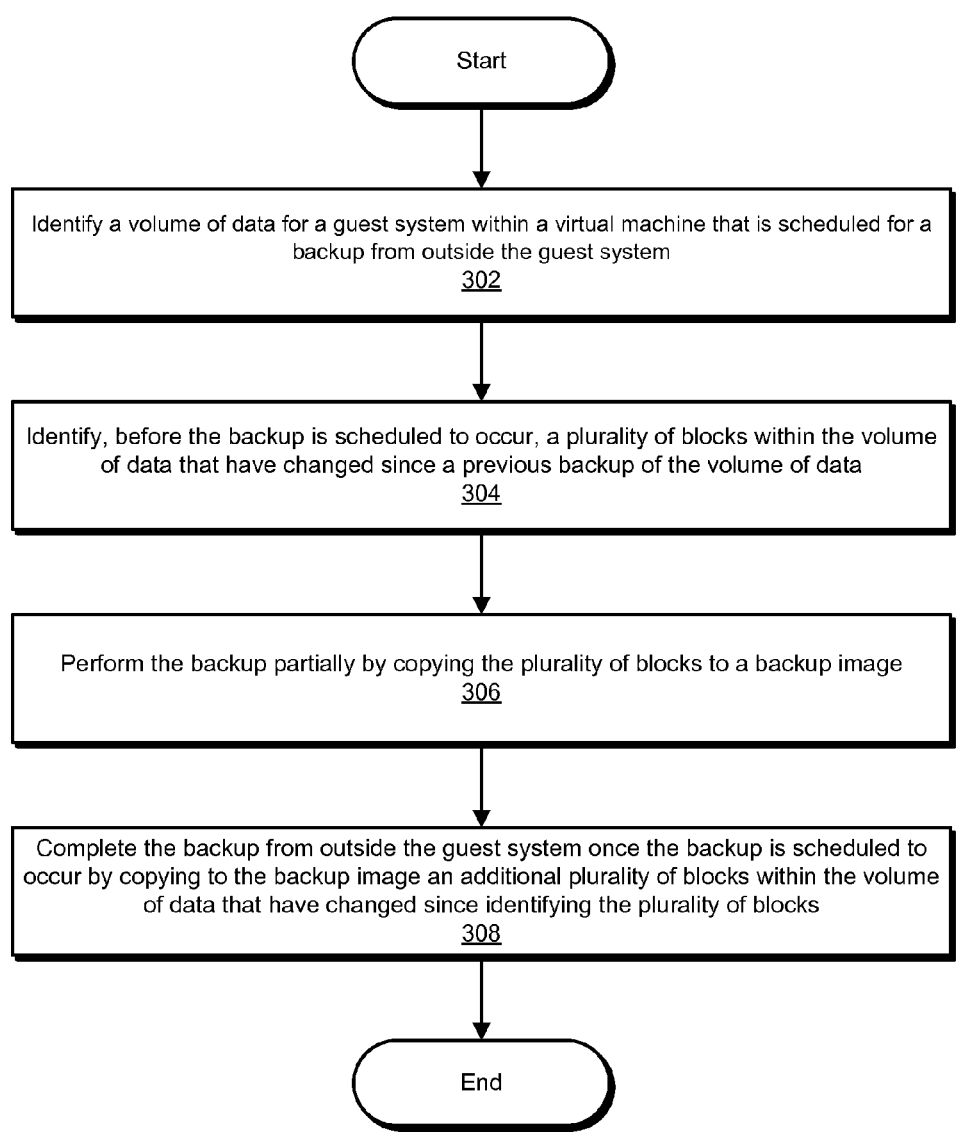
FIG. 3 is a flow diagram of an exemplary method for backing up virtual machine data.
Figure 4:
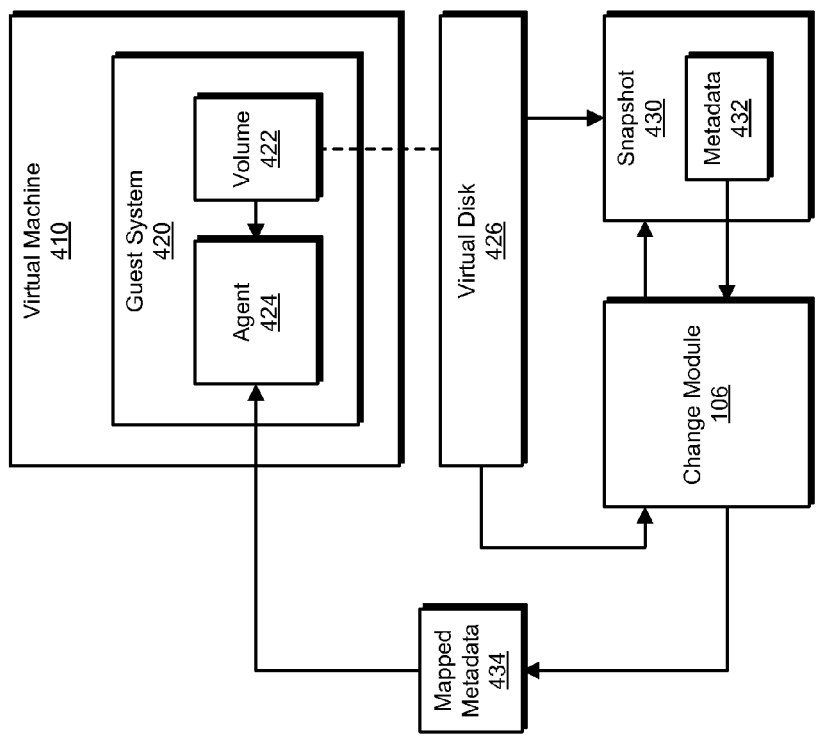
FIG. 4 is a block diagram of an exemplary system for backing up virtual machine data.

The following will provide, with reference to FIGS. 1, 2, and 4, detailed descriptions of exemplary systems for backing up virtual machine data. Detailed descriptions of corresponding computer-implemented methods will also be provided in connection with FIG. 3. In addition, detailed descriptions of an exemplary computing system and network architecture capable of implementing one or more of the embodiments described herein will be provided in connection with FIGS. 5 and 6, respectively.

FIG. 1 is a block diagram of exemplary system 100 for backing up virtual machine data. As illustrated in this figure, exemplary system 100 may include one or more modules 102 for performing one or more tasks. For example, and as will be explained in greater detail below, exemplary system 100 may also include an identification module 104 programmed to identify a volume of data for a guest system within a virtual machine that is scheduled for a backup from outside the guest system. Exemplary system 100 may additionally include a change module 106 programmed to identify, before the backup is scheduled to occur, a plurality of blocks within the volume of data that have changed since a previous backup of the volume of data. Exemplary system 100 may also include a performing module 108 programmed to partially perform the backup by copying the plurality of blocks to a backup image. Exemplary system 100 may additionally include a completion module 110 programmed to complete the backup from outside the guest system once the backup is scheduled to occur by copying to the backup image an additional plurality of blocks within the volume of data that have changed since identifying the plurality of blocks. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as the devices illustrated in FIG. 2 (e.g., computing device 202 and/or backup server 206), computing system 510 in FIG. 5, and/or portions of exemplary network architecture 600 in FIG. 6. One or more of modules 102 in FIG. 1 may also represent all or portions of one or more special-purpose computers configured to perform one or more tasks.

Exemplary system 100 in FIG. 1 may be implemented in a variety of ways. For example, all or a portion of exemplary system 100 may represent portions of exemplary system 200 in FIG. 2. As shown in FIG. 2, system 200 may include a computing device 202 in communication with a backup server 206 via a network 204. Computing device 202 may be programmed with one or more of modules 102. In some examples, one or more of modules 102 may run directly on computing device 202. Additionally or alternatively, one or more of modules 102 may run within a virtual machine 210.

In one embodiment, one or more of modules 102 from FIG. 1 may, when executed by at least one processor of computing device 202 and/or backup server 206, facilitate computing device 202 and/or backup server 206 in backing up virtual machine data. For example, and as will be described in greater detail below, one or more of modules 102 may cause computing device 202 to backup data for a guest system 220 within virtual machine 210 (e.g., a volume 222 stored within a virtual disk file 224). For example, and as will be described in greater detail below, identification module 104 may be programmed to identify volume 222 for guest system 220 within virtual machine 210 that is scheduled for a backup from outside guest system 220. Change module 106 may be programmed to identify, before the backup is scheduled to occur, blocks 232 within volume 222 that have changed since a previous backup of volume 222. Performing module 108 may be programmed to partially perform the backup by copying blocks 232 to a backup image 230. Completion module 110 may be programmed to complete the backup from outside guest system 220 once the backup is scheduled to occur by copying to backup image 230 blocks 234 within volume 222 that have changed since identifying blocks 232.

Computing device 202 generally represents any type or form of computing device capable of reading computer-executable instructions. Examples of computing device 202 include, without limitation, hypervisors, host systems, desktops, servers, laptops, tablets, cellular phones, Personal Digital Assistants (PDAs), multimedia players, embedded systems, combinations of one or more of the same, exemplary computing system 510 in FIG. 5, or any other suitable computing device.

Backup server 206 generally represents any type or form of computing device that is capable of storing and/or managing backups. Examples of backup server 206 include, without limitation, application servers and database servers configured to provide various database services and/or run certain software applications.

Network 204 generally represents any medium or architecture capable of facilitating communication or data transfer. Examples of network 204 include, without limitation, an intranet, a Wide Area Network (WAN), a Local Area Network (LAN), a Storage Area Network (SAN), a Personal Area Network (PAN), the Internet, Power Line Communications (PLC), a cellular network (e.g., a Global System for Mobile Communications (GSM) network), exemplary network architecture 600 in FIG. 6, or the like. Network 204 may facilitate communication or data transfer using wireless or wired connections. In one embodiment, network 204 may facilitate communication between computing device 202 and backup server 206.

FIG. 3 is a flow diagram of an exemplary computer-implemented method 300 for backing up virtual machine data. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, computing system 510 in FIG. 5, and/or portions of exemplary network architecture 600 in FIG. 6.

As illustrated in FIG. 3, at step 302 one or more of the systems described herein may identify a volume of data for a guest system within a virtual machine that is scheduled for a backup from outside the guest system. For example, at step 302 identification module 104 may, as part of computing device 202 in FIG. 2, identify volume 222 for guest system 220 within virtual machine 210 that is scheduled for a backup from outside guest system 220.

As used herein, the term "volume" may refer to any distinctly identifiable collection of data. In some examples, the volume may correspond to a logical storage unit used by a file system to store one or more files. In some examples, the term "volume" may refer to an addressable storage space capable of storing files.

As used herein, the phrase "virtual machine" generally refers to a computing system platform that may not have direct correspondence to (e.g., that is abstracted from) hardware of an underlying host machine. For example, hardware of a host system may be abstracted to a virtual machine using a hypervisor, a virtual machine manager, and/or other virtualization software. A virtual machine may run a guest operating system and/or various other software applications. As used herein, the phrase "guest system" may refer to any system executing within a platform provided by a virtual machine. For example, the phrase "guest system" may refer to an operating system and/or one or more application configured to execute within a virtual machine.

As used herein, the term "backup" may refer to any procedure (configured, scheduled, in progress, and/or completed) to backup, duplicate, and/or protect data and/or the results of any such procedure. In some examples, the term "backup" may refer to an incremental backup. As used herein, the phrase "incremental backup" generally refers to any data backup that includes less than every data unit (e.g., segment, block, sector, cluster, file, etc.) in a set of data units. For example, an incremental backup may only include data units that have changed since a previous point in time (e.g., the time a previous full backup or other incremental backup was taken). Accordingly, an incremental backup may only include data that has changed (e.g., data that has been modified, added, deleted, etc.) since a previous backup.

Identification module 104 may identify the volume of data in any suitable manner. In some examples, identification module 104 may identify the volume of data by identifying a virtual disk file that stores the volume of data. Additionally or alternatively, identification module 104 may identify the volume of data by identifying a backup job and/or configuration that refers to and/or includes the volume of data. In some examples, at least a portion of identification module 104 may execute within the guest system to identify the volume of data. Additionally or alternatively, in some examples at least a portion of identification module 104 may execute outside the guest system (e.g., on a system that hosts the guest system).

Returning to FIG. 3, at step 304 one or more of the systems described herein may identify, before the backup is scheduled to occur, a plurality of blocks within the volume of data that have changed since a previous backup of the volume of data. For example, at step 304 change module 106 may, as part of computing device 202 in FIG. 2, identify, before the backup is scheduled to occur, blocks 232 within volume 222 that have changed since a previous backup of volume 222.

As used herein, the term "block" may refer to a block, sector, cluster, region, file system block, extent, and/or any other suitable unit of storage.

As will be explained in greater detail below, change module 106 may identify the plurality of blocks in any suitable context. In some examples, at least a part of change module 106 may execute within the guest system. Additionally or alternatively, at least a part of change module 106 may execute outside the guest system (e.g., on a system that hosts the guest system).

In some examples, change module 106 may identify the plurality of blocks by (1) creating a snapshot of a virtual disk of the virtual machine comprising the volume of data, (2) identifying block metadata within the snapshot that may indicate that the plurality of blocks have changed since creating the snapshot and (3) sending the block metadata to the guest system within the virtual machine. As used herein, the term "snapshot" may refer to any representation of a volume of data and/or a portion of a volume in a certain state and/or point in time. In some examples, a snapshot may function by representing changes to a volume of a data since a point in time. As used herein, the phrase "block metadata" may refer to any data capable of identifying one or more blocks within a volume. For example, the phrase "block metadata" may refer to one or more block numbers and/or addresses (e.g., maintained by a snapshot to identify changed blocks).

Change module 106 may send the block metadata to the guest system in any of a variety of ways. For example, change module 106 may use an application programming interface for communicating to the guest system from a host system (e.g., a hypervisor). In some examples, change module 106 may first translate the block metadata for use by the guest system by mapping at least one block identifier of a changed block within the block metadata to a virtual block identifier that identifies the changed block with an addressing scheme readable by the guest system. The virtual block identifier may include any information for identifying a block from within the guest system. For example, the virtual block identifier may include an identifier of a virtual storage device and/or an address on a virtual storage device. In some examples, change module 106 may operate from outside the guest system (e.g., on a host system) to translate the block metadata. Additionally or alternatively, change module 106 may operate from within the guest system (e.g., as a part of an agent within the guest system) to translate the block metadata.

In some examples, change module 106 may send the block metadata from a host system that hosts the virtual machine without sending a content of the plurality of blocks to the guest system. For example, change module 106 may send a communication to an agent within the guest system useful to the agent for identifying changed blocks (e.g., the locations of the changed blocks) without sending the changed blocks to the guest system.

In some examples, change module 106 may also release the snapshot before partially performing the backup. For example, change module 106 may release the snapshot immediately after identifying the plurality of blocks. In some examples, change module 106 may release the snapshot before starting to partially perform the backup. Additionally or alternatively, change module 106 may release the snapshot before completing the partial performance of the backup (e.g., backing up the plurality of blocks identified as changed in the background before the scheduled time of the backup). In this manner, change module 106 may avoid input/output overhead that may otherwise have impacted the performance of the guest system. In some examples, change module 106 may have tracked changed blocks of the virtual disk without a snapshot. In these examples also, changes module 106 may collect and provide the block metadata to the guest system while avoiding a significant performance impact.

In some examples, change module 106 may use a change tracking mechanism of a hypervisor of the virtual machine to track the changed blocks. In some examples, change module 106 may operate from within the guest system and track changed blocks as a part of a filter driver loaded on the guest system. However, by instead tracking changed blocks from the outside of the guest system (e.g., from a host system that hosts the guest system), change module 106 may permit an update without disrupting the operation of the guest system and/or requiring a reboot of the guest system.

FIG. 4 is a block diagram of an exemplary computing system 400. As shown in FIG. 4, exemplary system 400 may include a virtual machine 410 with a guest system 420. Guest system 420 may have access to a virtual disk 426 (e.g., a VMDK file). A volume 422 may expose data on virtual disk 426 to guest system 420. In one example, change module 106 may take a snapshot 430 of virtual disk 426. Change module 106 may subsequently retrieve metadata 432 from snapshot 430 specifying blocks within virtual disk 426 that have changed. Change module 106 may then translate the information specifying the changed blocks to be addressed from the point of view of guest system 420 (e.g., to locate the changed blocks on volume 422), creating mapped metadata 434. Change module 106 may then provide mapped metadata 434 to agent 424, which may (as will be described in greater detail below) begin to back up the changed blocks indicated in mapped metadata 434 from volume 422.

Returning to FIG. 3, at step 306 one or more of the systems described herein may partially perform the backup by copying the plurality of blocks to a backup image. For example, at step 306 performing module 108 may, as part of computing device 202 in FIG. 2, partially perform the backup by copying blocks 232 to backup image 230.

Performing module 108 may partially perform the backup in any suitable manner. For example, performing module 108 may partially perform the backup via an agent executing within the guest system. As used herein, the term "agent" may refer to any program, module, daemon, script, and/or process capable of executing within a virtual machine and/or receiving and/or sending communications outside the virtual machine. In some examples, the agent may include performing module 108.

In some examples, performing module 108 may partially perform the backup via a virtual appliance and/or via another guest system. For example, performing module 108 may export the virtual disk file that stores the volume to the virtual appliance.

In some examples, performing module 108 may (1) determine that a load of at least one computing resource used by the guest system may be below a predetermined level and (2) partially perform the backup in response to the load of the computing resource being below the predetermined level. As used herein, the phrase "computing resource" may refer to any resource (e.g., of the guest system and/or a host of the guest system) that may be used in a backup operation. Examples of computing resources may include, without limitation, processors, input/output devices, and network devices. In some examples, performing module 108 may monitor the load of both the virtual machine and a host of the virtual machine. Performing module 108 may determine the load in any suitable manner. For example, performing module 108 may calculate the load with a moving average (e.g., to determine load trends and/or to smooth out short but large load changes).

In some examples, performing module 108 may (1) determine that a load of at least one computing resource used by the guest system has risen above a predetermined level and (2) throttle the backup in response to the load of the computing resource rising above the predetermined level. For example, performing module 108 may ensure that partially performing the backup does not interfere with the operation and/or performance of any primary application on the guest system. In some examples (e.g., where the load indicates that any backup operation may interfere with a primary application), performing module 108 may halt the backup before all of the identified changed blocks have been backed up. In this example, performing module 108 may identify the remaining blocks to complete in a future backup operation.

In some examples, by partially performing the backup while the guest system runs, performing module 108 may create an incomplete and/or inconsistent backup. As will be explained in greater detail below, in some examples one or more of the systems described herein may make the backup complete and/or consistent (e.g., at the scheduled time of the backup).

Returning to FIG. 3, at step 308 one or more of the systems described herein may complete the backup from outside the guest system once the backup is scheduled to occur by copying to the backup image an additional plurality of blocks within the volume of data that have changed since identifying the plurality of blocks. For example, at step 308 completion module 110 may, as part of computing device 202 in FIG. 2, complete the backup from outside guest system 220 once the backup is scheduled to occur by copying to backup image 230 blocks 234 within volume 222 that have changed since identifying blocks 232.

Completion module 110 may complete the backup in any suitable manner. For example, completion module 110 may take a snapshot of the virtual machine and complete the backup from the snapshot. By completing the backup up to a single point in time (e.g., of the snapshot), completion module 110 may bring the backup to consistency. After the backup is complete, completion module 110 may release the snapshot.

In some examples, completion module 110 may only have a small proportion of blocks to add to the backup in order to complete the backup (because, e.g., the systems described herein may have already backed up most of the blocks that had changed since the previous scheduled backup). Accordingly, in some examples, completion module 110 may have a minimal impact on computing resources, the guest system, and/or primary applications.

Figure 5:
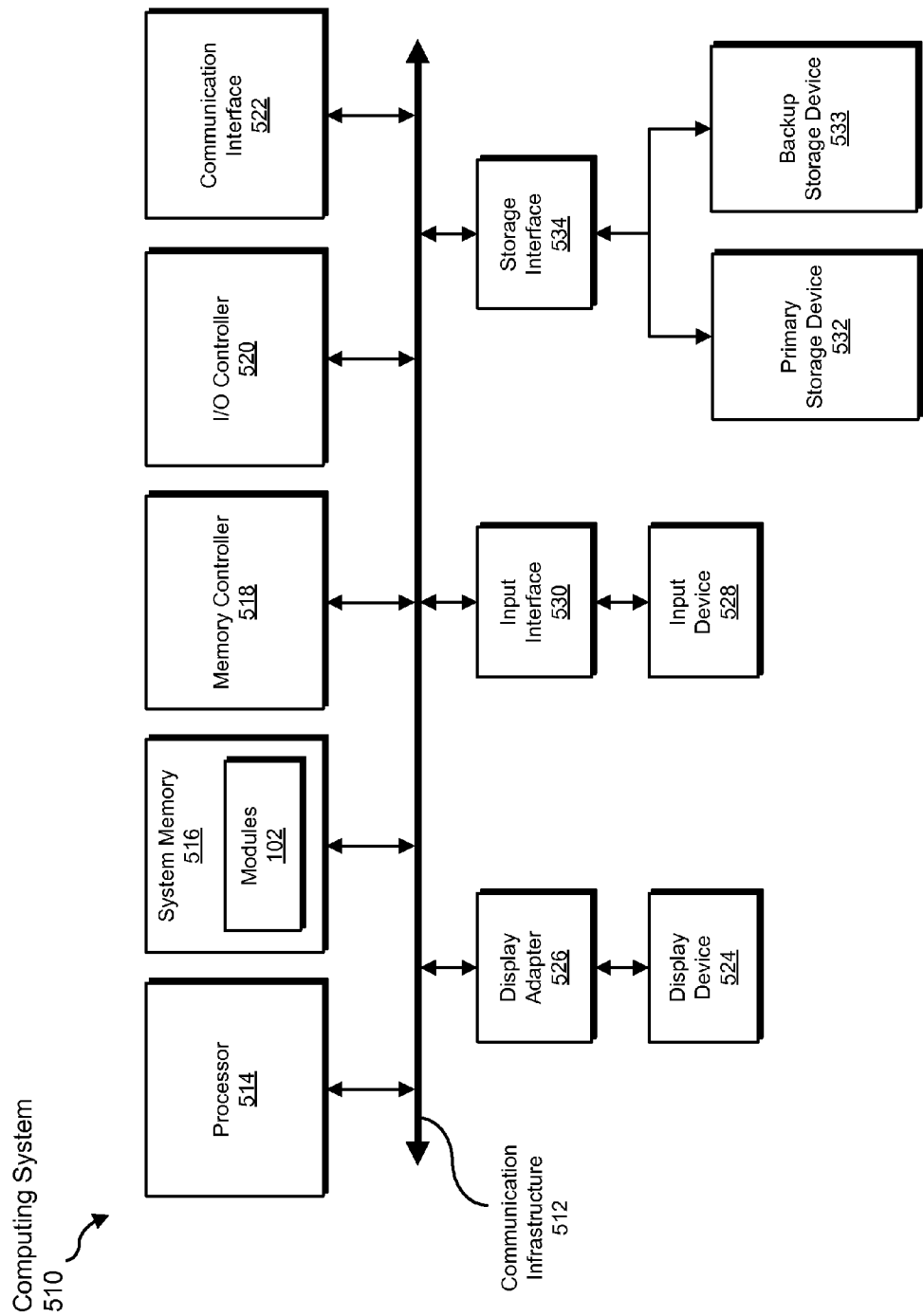
FIG. 5 is a block diagram of an exemplary computing system capable of implementing one or more of the embodiments described and/or illustrated herein.

FIG. 5 is a block diagram of an exemplary computing system 510 capable of implementing one or more of the embodiments described and/or illustrated herein. For example, all or a portion of computing system 510 may perform and/or be a means for performing, either alone or in combination with other elements, one or more of the identifying, creating, sending, releasing, performing, throttling, determining, and completing steps described herein. All or a portion of computing system 510 may also perform and/or be a means for performing any other steps, methods, or processes described and/or illustrated herein.

Computing system 510 broadly represents any single or multi-processor computing device or system capable of executing computer-readable instructions. Examples of computing system 510 include, without limitation, workstations, laptops, client-side terminals, servers, distributed computing systems, handheld devices, or any other computing system or device. In its most basic configuration, computing system 510 may include at least one processor 514 and a system memory 516.

Processor 514 generally represents any type or form of processing unit capable of processing data or interpreting and executing instructions. In certain embodiments, processor 514 may receive instructions from a software application or module. These instructions may cause processor 514 to perform the functions of one or more of the exemplary embodiments described and/or illustrated herein.

System memory 516 generally represents any type or form of volatile or non-volatile storage device or medium capable of storing data and/or other computer-readable instructions. Examples of system memory 516 include, without limitation, Random Access Memory (RAM), Read Only Memory (ROM), flash memory, or any other suitable memory device. Although not required, in certain embodiments computing system 510 may include both a volatile memory unit (such as, for example, system memory 516) and a non-volatile storage device (such as, for example, primary storage device 532, as described in detail below). In one example, one or more of modules 102 from FIG. 1 may be loaded into system memory 516.

In certain embodiments, exemplary computing system 510 may also include one or more components or elements in addition to processor 514 and system memory 516. For example, as illustrated in FIG. 5, computing system 510 may include a memory controller 518, an Input/Output (I/O) controller 520, and a communication interface 522, each of which may be interconnected via a communication infrastructure 512. Communication infrastructure 512 generally represents any type or form of infrastructure capable of facilitating communication between one or more components of a computing device. Examples of communication infrastructure 512 include, without limitation, a communication bus (such as an Industry Standard Architecture (ISA), Peripheral Component Interconnect (PCI), PCI Express (PCIe), or similar bus) and a network.

Memory controller 518 generally represents any type or form of device capable of handling memory or data or controlling communication between one or more components of computing system 510. For example, in certain embodiments memory controller 518 may control communication between processor 514, system memory 516, and I/O controller 520 via communication infrastructure 512.

I/O controller 520 generally represents any type or form of module capable of coordinating and/or controlling the input and output functions of a computing device. For example, in certain embodiments I/O controller 520 may control or facilitate transfer of data between one or more elements of computing system 510, such as processor 514, system memory 516, communication interface 522, display adapter 526, input interface 530, and storage interface 534.

Communication interface 522 broadly represents any type or form of communication device or adapter capable of facilitating communication between exemplary computing system 510 and one or more additional devices. For example, in certain embodiments communication interface 522 may facilitate communication between computing system 510 and a private or public network including additional computing systems. Examples of communication interface 522 include, without limitation, a wired network interface (such as a network interface card), a wireless network interface (such as a wireless network interface card), a modem, and any other suitable interface. In at least one embodiment, communication interface 522 may provide a direct connection to a remote server via a direct link to a network, such as the Internet. Communication interface 522 may also indirectly provide such a connection through, for example, a local area network (such as an Ethernet network), a personal area network, a telephone or cable network, a cellular telephone connection, a satellite data connection, or any other suitable connection.

In certain embodiments, communication interface 522 may also represent a host adapter configured to facilitate communication between computing system 510 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 522 may also allow computing system 510 to engage in distributed or remote computing. For example, communication interface 522 may receive instructions from a remote device or send instructions to a remote device for execution.

As illustrated in FIG. 5, computing system 510 may also include at least one display device 524 coupled to communication infrastructure 512 via a display adapter 526. Display device 524 generally represents any type or form of device capable of visually displaying information forwarded by display adapter 526. Similarly, display adapter 526 generally represents any type or form of device configured to forward graphics, text, and other data from communication infrastructure 512 (or from a frame buffer, as known in the art) for display on display device 524.

As illustrated in FIG. 5, exemplary computing system 510 may also include at least one input device 528 coupled to communication infrastructure 512 via an input interface 530. Input device 528 generally represents any type or form of input device capable of providing input, either computer or human generated, to exemplary computing system 510. Examples of input device 528 include, without limitation, a keyboard, a pointing device, a speech recognition device, or any other input device.

As illustrated in FIG. 5, exemplary computing system 510 may also include a primary storage device 532 and a backup storage device 533 coupled to communication infrastructure 512 via a storage interface 534. Storage devices 532 and 533 generally represent any type or form of storage device or medium capable of storing data and/or other computer-readable instructions. For example, storage devices 532 and 533 may be a magnetic disk drive (e.g., a so-called hard drive), a solid state drive, a floppy disk drive, a magnetic tape drive, an optical disk drive, a flash drive, or the like. Storage interface 534 generally represents any type or form of interface or device for transferring data between storage devices 532 and 533 and other components of computing system 510. In one example, database 120 from FIG. 1 may be stored in primary storage device 532.

In certain embodiments, storage devices 532 and 533 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 532 and 533 may also include other similar structures or devices for allowing computer software, data, or other computer-readable instructions to be loaded into computing system 510. For example, storage devices 532 and 533 may be configured to read and write software, data, or other computer-readable information. Storage devices 532 and 533 may also be a part of computing system 510 or may be a separate device accessed through other interface systems.

Many other devices or subsystems may be connected to computing system 510. Conversely, all of the components and devices illustrated in FIG. 5 need not be present to practice the embodiments described and/or illustrated herein. The devices and subsystems referenced above may also be interconnected in different ways from that shown in FIG. 5. Computing system 510 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable-storage medium. The phrase "computer-readable-storage medium" generally refers to any form of device, carrier, or medium capable of storing or carrying computer-readable instructions. Examples of computer-readable-storage media include, without limitation, transmission-type media, such as carrier waves, and non-transitory-type media, such as magnetic-storage media (e.g., hard disk drives and floppy disks), optical-storage media (e.g., Compact Disks (CDs) or Digital Video Disks (DVDs)), electronic-storage media (e.g., solid-state drives and flash media), and other distribution systems.

The computer-readable-storage medium containing the computer program may be loaded into computing system 510. All or a portion of the computer program stored on the computer-readable-storage medium may then be stored in system memory 516 and/or various portions of storage devices 532 and 533. When executed by processor 514, a computer program loaded into computing system 510 may cause processor 514 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 510 may be configured as an Application Specific Integrated Circuit (ASIC) adapted to implement one or more of the exemplary embodiments disclosed herein.

Figure 6:
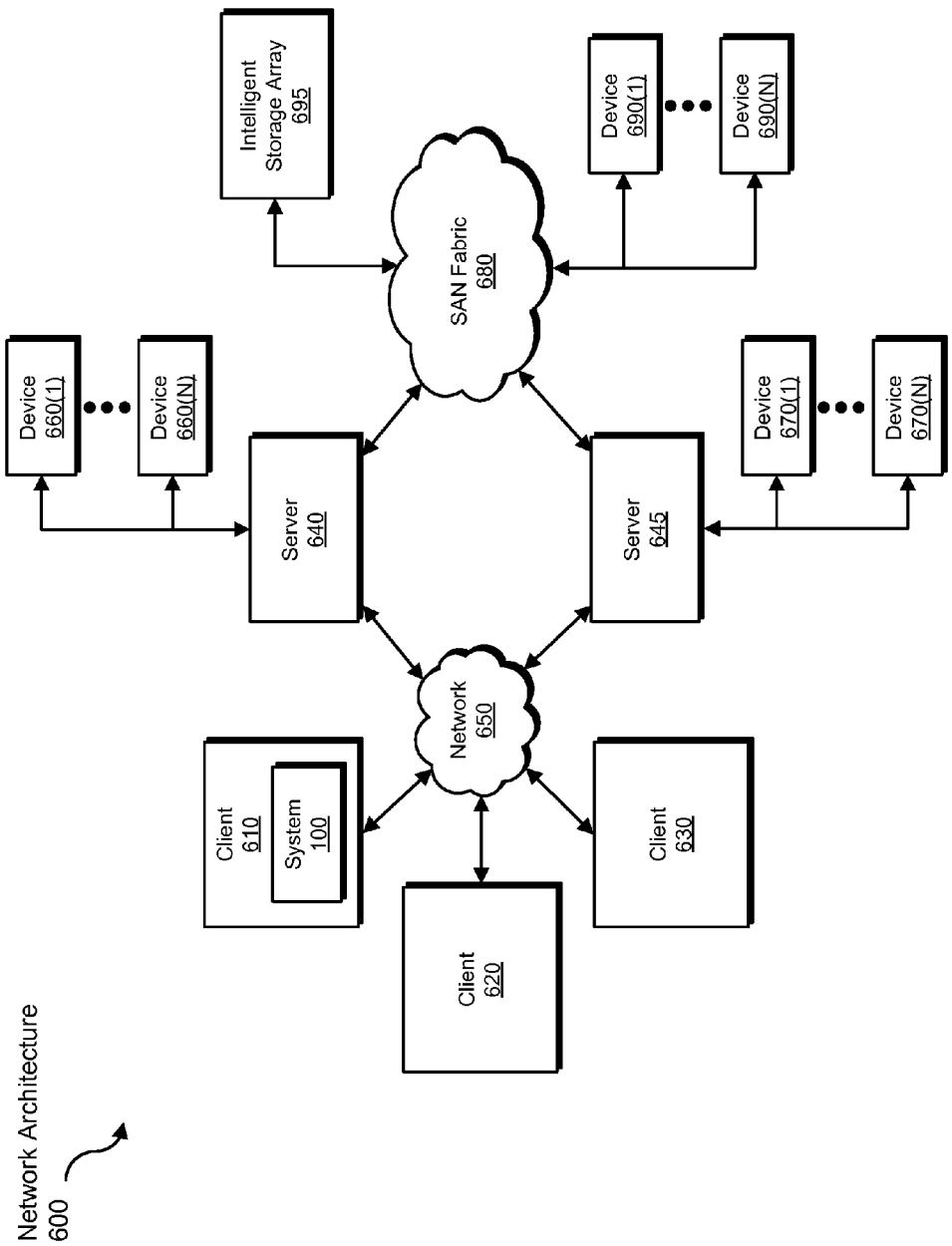
FIG. 6 is a block diagram of an exemplary computing network capable of implementing one or more of the embodiments described and/or illustrated herein.

FIG. 6 is a block diagram of an exemplary network architecture 600 in which client systems 610, 620, and 630 and servers 640 and 645 may be coupled to a network 650. As detailed above, all or a portion of network architecture 600 may perform and/or be a means for performing, either alone or in combination with other elements, one or more of the identifying, creating, sending, releasing, performing, throttling, determining, and completing steps disclosed herein. All or a portion of network architecture 600 may also be used to perform and/or be a means for performing other steps and features set forth in the instant disclosure.

Client systems 610, 620, and 630 generally represent any type or form of computing device or system, such as exemplary computing system 510 in FIG. 5. Similarly, servers 640 and 645 generally represent computing devices or systems, such as application servers or database servers, configured to provide various database services and/or run certain software applications. Network 650 generally represents any telecommunication or computer network including, for example, an intranet, a WAN, a LAN, a PAN, or the Internet. In one example, client systems 610, 620, and/or 630 and/or servers 640 and/or 645 may include all or a portion of system 100 from FIG. 1.

As illustrated in FIG. 6, one or more storage devices 660(1)-(N) may be directly attached to server 640. Similarly, one or more storage devices 670(1)-(N) may be directly attached to server 645. Storage devices 660(1)-(N) and storage devices 670(1)-(N) generally represent any type or form of storage device or medium capable of storing data and/or other computer-readable instructions. In certain embodiments, storage devices 660(1)-(N) and storage devices 670(1)-(N) may represent Network-Attached Storage (NAS) devices configured to communicate with servers 640 and 645 using various protocols, such as Network File System (NFS), Server Message Block (SMB), or Common Internet File System (CIFS).

Servers 640 and 645 may also be connected to a Storage Area Network (SAN) fabric 680. SAN fabric 680 generally represents any type or form of computer network or architecture capable of facilitating communication between a plurality of storage devices. SAN fabric 680 may facilitate communication between servers 640 and 645 and a plurality of storage devices 690(1)-(N) and/or an intelligent storage array 695. SAN fabric 680 may also facilitate, via network 650 and servers 640 and 645, communication between client systems 610, 620, and 630 and storage devices 690(1)-(N) and/or intelligent storage array 695 in such a manner that devices 690(1)-(N) and array 695 appear as locally attached devices to client systems 610, 620, and 630. As with storage devices 660(1)-(N) and storage devices 670(1)-(N), storage devices 690(1)-(N) and intelligent storage array 695 generally represent any type or form of storage device or medium capable of storing data and/or other computer-readable instructions.

In certain embodiments, and with reference to exemplary computing system 510 of FIG. 5, a communication interface, such as communication interface 522 in FIG. 5, may be used to provide connectivity between each client system 610, 620, and 630 and network 650. Client systems 610, 620, and 630 may be able to access information on server 640 or 645 using, for example, a web browser or other client software. Such software may allow client systems 610, 620, and 630 to access data hosted by server 640, server 645, storage devices 660(1)-(N), storage devices 670(1)-(N), storage devices 690(1)-(N), or intelligent storage array 695. Although FIG. 6 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 640, server 645, storage devices 660(1)-(N), storage devices 670(1)-(N), storage devices 690(1)-(N), intelligent storage array 695, or any combination thereof. All or a portion of one or more of the exemplary embodiments disclosed herein may also be encoded as a computer program, stored in server 640, run by server 645, and distributed to client systems 610, 620, and 630 over network 650.

As detailed above, computing system 510 and/or one or more components of network architecture 600 may perform and/or be a means for performing, either alone or in combination with other elements, one or more steps of an exemplary method for backing up virtual machine data.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of exemplary system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of exemplary system 100 in FIG. 1 may be implemented within a virtual environment. For example, modules and/or data described herein may reside and/or execute within a virtual machine. Additionally or alternatively, the modules and/or data described herein may reside and/or execute within a virtualization layer. As used herein, the phrase "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable-storage media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules recited herein may receive snapshot metadata to be transformed, transform the snapshot metadata, output a result of the transformation to a guest system, use the result of the transformation to perform a partial backup background operation, and store the result of the transformation to a storage device. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

What is claimed is:

1. A computer-implemented method for backing up virtual machine data, at least a portion of the method being performed by a computing device comprising at least one processor, the method comprising:

identifying a volume of data for a guest system within a virtual machine that is scheduled for a backup from outside the guest system, the backup to represent the volume of data at a point in time;

identifying, from outside the guest system, before the backup is scheduled to occur, a plurality of blocks within the volume of data that have changed since a previous backup of the volume of data;

mapping, from outside the guest system, at least one block identifier of a changed block within the plurality of blocks to a virtual block identifier that identifies the changed block with an addressing scheme readable by the guest system, thereby generating mapped information;

sending, from outside the guest system, the mapped information to the guest system, wherein the mapped information comprises at least one of a block number and a block address;

in response to at least one of determining that a load of the guest system is below a predetermined level and determining that a load of a host of the virtual machine is below a predetermined level, partially performing the backup, from within the guest system, before the backup is scheduled to occur, by copying the plurality of blocks to a backup image, but not copying an additional plurality of blocks within the volume of data that changed since identifying the plurality of blocks but before the point in time at which the backup is scheduled, thereby causing the backup image to be incomplete and point-in-time inconsistent;

completing the backup from outside the guest system once the backup is scheduled to occur by copying to the backup image the additional plurality of blocks within the volume of data that have changed since identifying the plurality of blocks, thereby causing the backup image to be consistent with the point in time at which the backup is scheduled.

2. The computer-implemented method of claim 1, wherein identifying the plurality of blocks comprises:
creating a snapshot of a virtual disk of the virtual machine comprising the volume of data;
identifying block metadata within the snapshot that indicates that the plurality of blocks have changed since creating the snapshot;
sending the block metadata to the guest system within the virtual machine.

3. The computer-implemented method of claim 2, wherein sending the block metadata to the guest system comprises translating the block metadata for use by the guest system by mapping at least one block identifier of a changed block within the block metadata to a virtual block identifier that identifies the changed block with an addressing scheme readable by the guest system.

4. The computer-implemented method of claim 2, wherein sending the block metadata to the guest system within the virtual machine comprises sending the block metadata from a host system that hosts the virtual machine without sending a content of the plurality of blocks to the guest system.

5. The computer-implemented method of claim 2, further comprising releasing the snapshot before partially performing the backup.

6. The computer-implemented method of claim 1, wherein partially performing the backup comprises:
determining that a load of at least one computing resource used by the guest system is below a predetermined level;
partially performing the backup in response to the load of the computing resource being below the predetermined level.

7. The computer-implemented method of claim 1, wherein partially performing the backup comprises:
determining that a load of at least one computing resource used by the guest system has risen above a predetermined level;
throttling the backup in response to the load of the computing resource rising above the predetermined level.

8. The computer-implemented method of claim 1, wherein partially performing the backup comprises partially performing the backup via an agent executing within the guest system.

9. A system for backing up virtual machine data, the system comprising:
an identification module programmed to identify a volume of data for a guest system within a virtual machine that is scheduled for a backup from outside the guest system, the backup to represent the volume of data at a point in time;
a change module programmed to identify, from outside the guest system, before the backup is scheduled to occur, a plurality of blocks within the volume of data that have changed since a previous backup of the volume of data;
a performing module programmed to:
map, from outside the guest system, at least one block identifier of a changed block within the plurality of blocks to a virtual block identifier that identifies the changed block with an addressing scheme readable by the guest system, thereby generating mapped information;
send, from outside the guest system, the mapped information to the guest system, wherein the mapped information comprises at least one of a block number and a block address;
in response to at least one of determining that a load of the guest system is below a predetermined level and determining that a load of a host of the virtual machine is below a predetermined level, partially perform the backup, from within the guest system, before the backup is scheduled to occur, by copying the plurality of blocks to a backup image, but not copying an additional plurality of blocks within the volume of data that changed since identifying the plurality of blocks but before the point in time at which the backup is scheduled, thereby causing the backup image to be incomplete and point-in-time inconsistent;
a completion module programmed to complete the backup from outside the guest system once the backup is scheduled to occur by copying to the backup image the additional plurality of blocks within the volume of data that have changed since identifying the plurality of blocks, thereby causing the backup image to be consistent with the point in time at which the backup is scheduled;
at least one processor configured to execute the identification module, the change module, the performing module and the completion module.

10. The system of claim 9, wherein the change module is programmed to identify the plurality of blocks by:
creating a snapshot of a virtual disk of the virtual machine comprising the volume of data;
identifying block metadata within the snapshot that indicates that the plurality of blocks have changed since creating the snapshot;
sending the block metadata to the guest system within the virtual machine.

11. The system of claim 10, wherein the change module is programmed to send the block metadata to the guest system by translating the block metadata for use by the guest system by mapping at least one block identifier of a changed block within the block metadata to a virtual block identifier that identifies the changed block with an addressing scheme readable by the guest system.

12. The system of claim 10, wherein the change module is programmed to send the block metadata to the guest system within the virtual machine by sending the block metadata from a host system that hosts the virtual machine without sending a content of the plurality of blocks to the guest system.

13. The system of claim 10, further comprising a releasing module programmed to release the snapshot before partially performing the backup.

14. The system of claim 9, wherein the performing module is programmed to partially perform the backup by:
    determining that a load of at least one computing resource used by the guest system is below a predetermined level;
    partially performing the backup in response to the load of the computing resource being below the predetermined level.

15. The system of claim 9, wherein the performing module is programmed to partially perform the backup by:
    determining that a load of at least one computing resource used by the guest system has risen above a predetermined level;
    throttling the backup in response to the load of the computing resource rising above the predetermined level.

16. The system of claim 9, wherein the performing module is programmed to partially perform the backup via an agent executing within the guest system.

17. A non-transitory computer-readable-storage medium comprising one or more computer-readable instructions that, when executed by at least one processor of a computing device, cause the computing device to:
    identify a volume of data for a guest system within a virtual machine that is scheduled for a backup from outside the guest system, the backup to represent the volume of data at a point in time;
    identify, from outside the guest system, before the backup is scheduled to occur, a plurality of blocks within the volume of data that have changed since a previous backup of the volume of data;
    map, from outside the guest system, at least one block identifier of a changed block within the plurality of blocks to a virtual block identifier that identifies the changed block with an addressing scheme readable by the guest system, thereby generating mapped information;
    send, from outside the guest system, the mapped information to the guest system, wherein the mapped information comprises at least one of a block number and a block address;
    in response to at least one of determining that a load of the guest system is below a predetermined level and determining that a load of a host of the virtual machine is below a predetermined level, partially perform the backup, from within the guest system, before the backup is scheduled to occur, by copying the plurality of blocks to a backup image, but not copying an additional plurality of blocks within the volume of data that changed since identifying the plurality of blocks but before the point in time at which the backup is scheduled, thereby causing the backup image to be incomplete and point-in-time inconsistent;
    complete the backup from outside the guest system once the backup is scheduled to occur by copying to the backup image the additional plurality of blocks within the volume of data that have changed since identifying the plurality of blocks, thereby causing the backup image to be consistent with the point in time at which the backup is scheduled.

18. The non-transitory computer-readable-storage medium of claim 17, wherein identifying the plurality of blocks comprises:
    creating a snapshot of a virtual disk of the virtual machine comprising the volume of data;
    identifying block metadata within the snapshot that indicates that the plurality of blocks have changed since creating the snapshot;
    sending the block metadata to the guest system within the virtual machine.

19. The non-transitory computer-readable-storage medium of claim 18, wherein sending the block metadata to the guest system comprises translating the block metadata for use by the guest system by mapping at least one block identifier of a changed block within the block metadata to a virtual block identifier that identifies the changed block with an addressing scheme readable by the guest system.

20. The non-transitory computer-readable-storage medium of claim 18, wherein sending the block metadata to the guest system within the virtual machine comprises sending the block metadata from a host system that hosts the virtual machine without sending a content of the plurality of blocks to the guest system.

* * * * *